May 13, 1947.  A. L. ALVES  2,420,405

TRANSFER MOLDING PRESS

Filed Sept. 4, 1942  2 Sheets-Sheet 1

Inventor
Alexander L. Alves
By Rockwell & Bartholow
Attorneys

May 13, 1947.　　　A. L. ALVES　　　2,420,405
TRANSFER MOLDING PRESS
Filed Sept. 4, 1942　　　2 Sheets-Sheet 2

Inventor
Alexander L. Alves
By Rockwell & Bartholow
Attorneys

Patented May 13, 1947

2,420,405

UNITED STATES PATENT OFFICE 2,420,405

TRANSFER MOLDING PRESS

Alexander L. Alves, Watertown, Conn., assignor to The Watertown Manufacturing Company, Watertown, Conn., a corporation of Connecticut Application September 4, 1942, Serial No. 457,249

4 Claims. (Cl. 18—30)

This invention relates to molding presses, and more particularly to an hydraulic molding press particularly adapted for molding plastic materials, although it will be understood that the principles of the invention may be employed in other molding operations as well.

The improvements shown and described herein are adapted particularly for employment in a so-called transfer molding press, or one in which the material to be molded is placed in a chamber in the press instead of directly in the mold cavities, and is thereafter extruded or forced from the mold chamber into the cavities. In transfer molding operations it has been customary to provide the transfer chamber upon one of the mold sections, this section usually being a movable part intermediate the cooperating mold section and a plunger which enters the container to force the material into the mold cavities. In such an arrangement several disadvantages are present in that there is always a considerable sprue remaining at the end of the molding operation, and in that, owing to the necessity for providing the intermediate mold section, the stroke of the press will be correspondingly limited.

One object of the present invention is to provide a transfer molding press which will be simple in construction, inexpensive to manufacture, easy to install and manipulate, and the operation of which will result in the saving of time with respect to present molding presses doing comparable work.

Another object of the invention is the provision of a transfer molding press having stationary and movable mold sections, one of which is provided with a transfer chamber which extends substantially through the section, and which contains the plastic material which may be forced by a piston into the mold cavities.

A still further object of the invention is the provision of a transfer molding press provided with a transfer chamber arranged within one of the mold sections, thus permitting deeper draw moldings and simplifying the use of mold cores or inserts when desired.

A still further object of the invention is the provision of a molding press having a transfer chamber arranged substantially centrally within one of the mold sections, whereby the mold cavities may be located at a relatively short distance from the transfer chamber, and the plastic material thus has only a short travel in its passage from the chamber into the mold cavities.

In addition, the provision of a transfer chamber which extends entirely through the mold section in which it is formed to the parting line between the mating mold sections not only eliminates sprue, but also makes it possible to remove the molded products from the same level as that at which the material is introduced into the press.

To these and other ends the invention consists in the novel features and combinations of parts to be hereinafter described and claimed.

Figure 1:
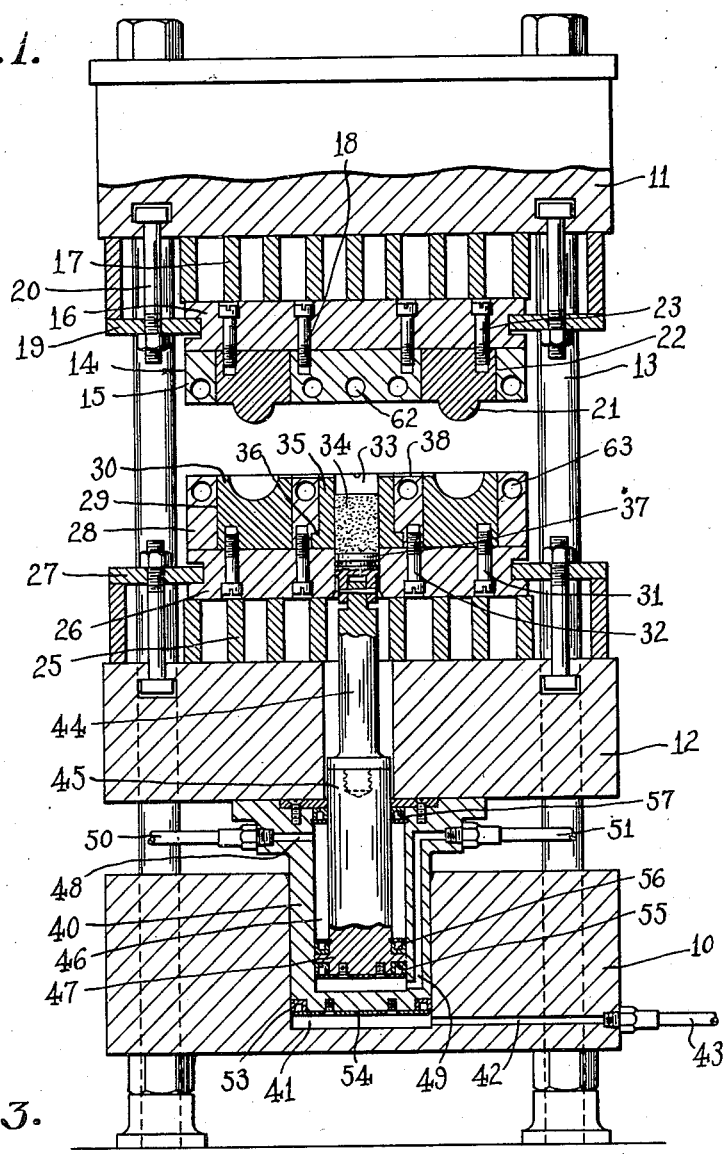
Fig. 1 is a sectional view of one form of transfer molding press embodying my invention, the press being shown in open position.

To illustrate a preferred form of my invention, I have shown a molding press having a bed 10, an upper platen 11, and a lower and, as shown herein, movable platen 12. The upper platen may be secured to the bed by tie-rods 13.

The upper mold section is designated generally by the numeral 14, and comprises a die holder 15 and a backing plate 16, the latter being held against spacer bars 17 which lie between it and the upper platen 11. The die holder may be secured to the backing plate by screws 18, and this plate is clamped to the platen 11 by clamping plates 19 held in place by the bolts 20. The male dies or force members 21 are, as shown, mounted within cavities 22 in the die holder 15, and are secured in place by screws 23 passing through the backing plates 16.

In like manner the lower mold section is supported upon spacer bars 25 which rest upon the movable platen 12, and this mold section likewise consists of the backing plate 26 clamped to the platen by clamping plates 27, and the die holder 28 having openings 29 in which are mounted the female dies or cavities 30, the dies and die holder being secured to the backing plates by the screws 31 and 32, respectively.

In this form of my invention a transfer chamber 33 is provided in the movable mold section. This chamber is adapted to contain a measured amount of the material 34 to be molded, which in the present instance is shown as a powdered plastic material. This chamber may be conveniently provided by means of a sleeve 35 disposed in a centrally formed opening in the die holder 28, the sleeve being provided with a shoulder 36 clamped between the die holder and the backing plate 26, the chamber 33 being constituted by the opening in this sleeve, which opening registers with an opening in the backing plate. A transfer piston 37 is arranged to move through the opening in the backing plate and through the transfer chamber 33 to force the material into the mold cavities in the dies 30, through gates 38 formed at the upper surface of the die holder and providing communication between the transfer chamber and the mold cavities. It will be apparent that these gates are relatively short, as the mold cavities may be located in close relation to the transfer chamber so that a minimum amount of waste material results.

The mold sections are closed by the elevation of the movable platen 12, which is effected by means of a ram 40 mounted below the platen within a cylinder 41 provided in the bed 10, which cylinder is connected with a source of hydraulic pressure (not shown) by means of a duct 42 and pipe 43. The movement of the transfer piston 37 is effected by means of a plunger 44 carried by a transfer ram 45 mounted in a cylinder 46 provided in the main ram 40. The plunger 45 is provided at its lower end with a piston 47 closely fitting the cylinder 46, and this cylinder is connected adjacent its upper and lower ends with a source of hydraulic pressure (not shown) by means of passages 48 and 49 and pipes 50 and 51. It will be apparent that with this arrangement the piston 47 is capable of two-way operation under hydraulic pressure to move the transfer piston 37 in both directions relatively to the main ram 40 and the movable platen and mold section carried thereby.

At the lower side of the ram 40 is provided an annular U-shaped packing 53 held in place by a follower plate 54, and similar U-shaped packings 55, 56 and 57 provide a tight leak-proof fit between the transfer ram 45 and the cylinder 46.

Figure 3:
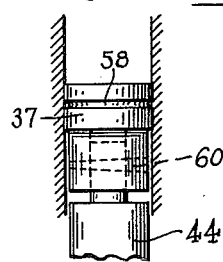
Fig. 3 is a detail view of the transfer ram.

As shown in Fig. 3, the piston 37 is provided with an annular groove or recess 58 which acts as a seal to prevent the material which is being molded from passing between the piston and the walls of the transfer chamber. If any of the material tends to so pass, it will fill this recess and thus seal any space between the piston and the walls of the chamber. As also shown in the drawings, the piston is of cup-shaped form at its lower portion so as to receive the upper reduced end of the plunger 44, and is connected thereto by means of a frangible tapered pin 60, so that if, upon withdrawal of the piston after the molding operation, an undue resistance is encountered, the pin will give way and thus prevent damage to other parts of the press.

In the event of the use of the press for thermosetting or thermo-plastic materials, for example, it is desirable to arrange for furnishing heat to the mold members. Provision is made for this purpose in the form of channels or bores 62 and 63, arranged as shown in the upper and lower die holders 15 and 28, which will ensure that the material will be maintained in a fluid condition during the transfer process.

Figure 2:
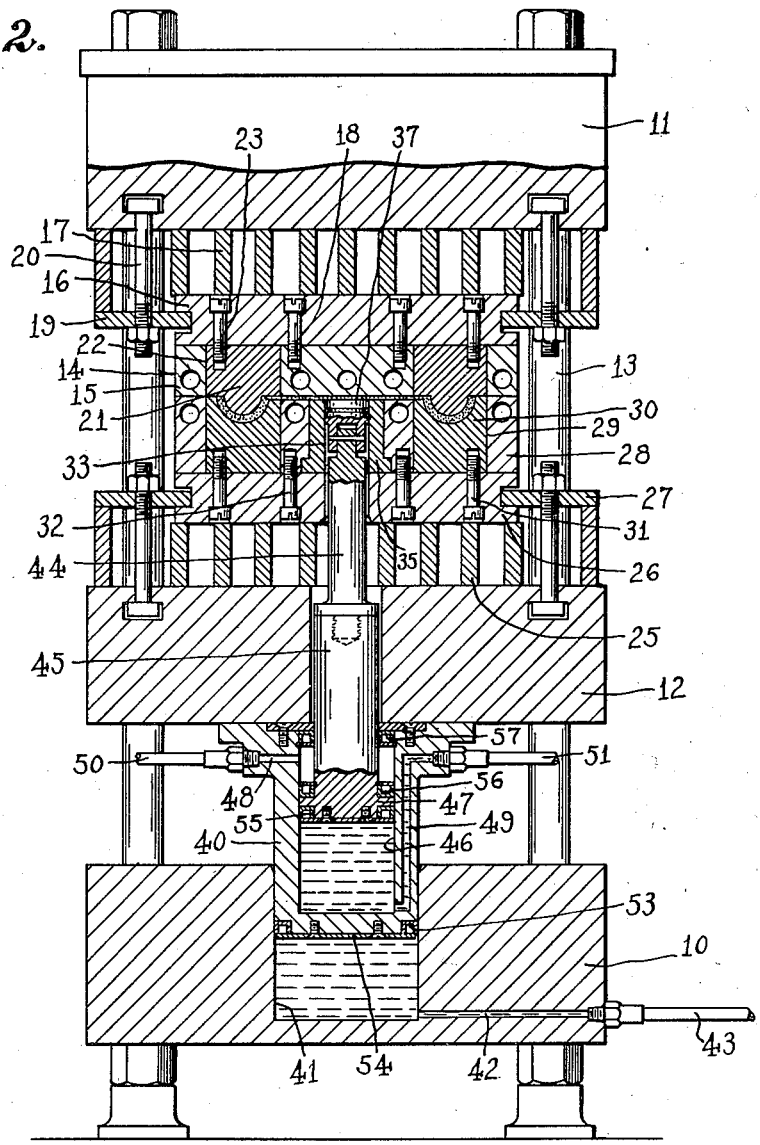
Fig. 2 is a similar view with the parts shown at the completion of a molding operation.

The operation of this form of my invention will now be briefly described. The platen 12 and lower mold section will be lowered to the position shown in Fig. 1, so that access to the transfer chamber 33 is permitted, thus allowing the operator to place the required amount of material 34 within the chamber. This lowering operation may be performed by means of usual pullback cylinders (not shown). After the chamber 33 has been loaded, hydraulic pressure is admitted to the cylinder 41 through the pipe 43, and the platen and movable mold section raised to the position shown in Fig. 2, so as to close the mold. It will be understood that, as the ram 40 rises, the transfer ram 45 will also be carried upwardly with it. When the mold sections have been tightly closed, hydraulic pressure is admitted to the cylinder 46 of the transfer ram through the pipe 51, thus effecting the raising of this ram relatively to the mold sections and the chamber 33. The piston 37 will then force the molding material from the transfer chamber through the gates 35 into the cavities of the dies 30, as shown in Fig. 2. With the selection of the proper amount of material, the latter will be substantially completely expelled from the transfer chamber 33, leaving only an amount of material in the chamber corresponding to the depth of the gates 35.

The mold sections are then opened by the lowering of the platen 12 by the pull-back cylinders, and the completed articles will be readily accessible for removal from the mold cavities. Hydraulic pressure may then be admitted through the pipe 50 to lower the transfer ram 45 so as to place the parts in the position shown in Fig. 1, ready for a succeeding molding operation.

It will be apparent that the mold operation is effected without any sprue remaining, and that when the press is in open position the parts are readily accessible for loading of the molding material, and for the placing of inserts or cores in the mold cavities if this is required. As there are no intermediate parts present between the stationary and movable mold sections, this entire space is available for the work of the operator.

While I have shown and described a preferred embodiment of my invention, it will be understood that it is not to be limited to all of the details shown, but is capable of modification and variation within the spirit of the invention and the scope of the claims.

What I claim is:

1. In an hydraulic press for molding plastic material under pressure, a pair of cooperating upper and lower mold sections having cavities for shaping the molded product, one of said sections being movable relatively to the other to close the mold cavities, the lower section having a transfer chamber therein extending to the parting line between said sections, a piston fitted into the transfer chamber to close the lower end thereof, an hydraulic ram connected to said piston, a cylinder within which the ram operates, said cylinder being connected to said movable mold section to move the same, an outer cylinder about said first-named cylinder whereby the latter acts as a ram to move the section to which it is connected, and manually controlled means for independently operating said inner and outer rams.

2. In an hydraulic press for molding plastic material, a pair of cooperating relatively movable upper and lower mold sections having mold cavities therein for shaping the molded products, the lower of said sections having a transfer chamber therein to contain the molding material, said chamber opening through the upper face of said section, a piston in said chamber, a ram connected to said piston, means for moving the movable mold section against the stationary mold section comprising a cylinder and a combined ram and cylinder working therein and connected to the movable mold section, the ram of said transfer piston being disposed in the cylinder portion of said combined ram and cylinder, and means for operating the ram of said transfer piston independently of said combined ram and cylinder.

3. In an hydraulic press for molding plastic material, a pair of cooperating upper and lower mold sections having cooperating means for shaping the molded product, the lower mold section being movable and having a transfer chamber extending upwardly to the parting line between said sections, an hydraulically operated piston fitted into said transfer chamber to close the lower end thereof, an inner hydraulic ram connected to said piston, and an outer hydraulic ram telescoped about said inner ram and connected to the movable lower mold section, and means for operating said inner ram independently of said outer ram whereby said movable mold section may first be raised into contact with the upper mold section by the operation of said outer hydraulic ram and said piston may thereafter be raised to transfer the molded material from said chamber to the mold cavities by operation of the inner ram.

4. In an hydraulic press for molding plastic material, a pair of cooperating upper and lower mold sections having cooperating means for shaping the molded product, one of said mold sections being stationary and the other being movable, said movable section having a transfer chamber extending to the parting line between said sections, an hydraulically operated piston fitted into said transfer chamber to close the lower end thereof, an inner hydraulic ram connected to said piston, an outer hydraulic ram telescoped about said inner ram and connected to the movable mold section whereby said section may first be moved into contact with the other section by operation of said outer hydraulic ram and said piston may thereafter be moved to transfer the molded material from said chamber to the mold cavities, and manually controlled means for independently operating said inner and outer rams.

ALEXANDER L. ALVES.

REFERENCES CITED

The following references are of record in the file of this patent:

UNITED STATES PATENTS

| Number | Name | Date |
|---|---|---|
| 1,948,205 | Du Donjon | Feb. 20, 1934 |
| 2,043,584 | Husted | June 9, 1936 |
| 1,961,941 | Pack | June 5, 1934 |
| 2,261,592 | Smith | Nov. 4, 1941 |

FOREIGN PATENTS

| Number | Country | Date |
|---|---|---|
| 518,294 | Great Britain | Feb. 22, 1940 |
| 687,432 | Germany | Jan. 29, 1940 |